(12) United States Patent
Cheng (10) Patent No.: US 8,939,313 B2
(45) Date of Patent: Jan. 27, 2015

(54) ANODIZED CLAD COPPER COOKWARE

(75) Inventor: Vincent Chi-seng Cheng, Hillsborough, CA (US)

(73) Assignee: Meyer Intellectual Properties Limited (VG)

( * ) Notice: Subject to any disclaimer, the term of this patent is extended or adjusted under 35 U.S.C. 154(b) by 899 days.

(21) Appl. No.: 12/858,564

(22) Filed: Aug. 18, 2010

(65) Prior Publication Data

US 2011/0056956 A1    Mar. 10, 2011

Related U.S. Application Data (60) Provisional application No. 61/239,869, filed on Sep. 4, 2009.

(51) Int. Cl.
*A47J 36/02* (2006.01)
*B21D 51/22* (2006.01)

(52) U.S. Cl.
CPC ................. *A47J 36/02* (2013.01); *B21D 51/22* (2013.01)
USPC ..................................................... 220/573.1

(58) Field of Classification Search
USPC ............................................ 220/573.1; 72/47
See application file for complete search history.

(56) References Cited

U.S. PATENT DOCUMENTS

| | | | | |
|---|---|---|---|---|
| 4,646,935 | A  * | 3/1987 | Ulam ......................... | 220/573.1 |
| 5,952,112 | A | 9/1999 | Spring | |
| 6,267,830 | B1 * | 7/2001 | Groll ............................. | 148/531 |
| 2004/0229079 | A1 * | 11/2004 | Groll ............................. | 428/653 |
| 2007/0000915 | A1 * | 1/2007 | Cheng .......................... | 219/621 |
| 2007/0275263 | A1 | 11/2007 | Groll | |
| 2008/0142526 | A1 * | 6/2008 | Cheng et al. ................ | 220/573.1 |

FOREIGN PATENT DOCUMENTS

| | | |
|---|---|---|
| JP | 2000-000167 A | 1/2000 |
| KR | 10-1984-0000247 B1 | 3/1984 |

* cited by examiner

*Primary Examiner* — Anthony Stashick
*Assistant Examiner* — Raven Collins
(74) *Attorney, Agent, or Firm* — Edward S. Sherman (57) ABSTRACT

An article of cookware has a copper core and is surrounded by relatively thinner outer aluminum layers. The outer aluminum layers are preferably anodized to provide a relatively inert hard and scratch resistant durable finish. This anodized finish also readily accepts non-stick finishes.

21 Claims, 7 Drawing Sheets

ANODIZED CLAD COPPER COOKWARE

CROSS REFERENCE TO RELATED APPLICATIONS

The present application claims priority to and the benefit of the U.S. Provisional Patent application of the same title, filed on 4 Sep. 2009, having application Ser. No. 61/239,869.

BACKGROUND OF INVENTION

The present invention relates to an improvement in the construction and fabrication of copper cookware.

While copper cookware is preferred for its superior heat transfer capabilities, the food contacting portions must be covered with an inert coating that prevents the leaching of copper and copper oxides into food, as well as the staining of the cooking surface. Traditionally, tin coatings have been used. However, these wear off over time. Further, tin is a soft metal which scratches easily.

Another approach is to clad copper with stainless steel so that after forming the food contacting surface is steel. While stainless steel is relatively durable and inert, it scratches easily. Far more significant, stainless steel is a poor conductor of heat, so the cooking performance is not as good as tinned copper, even when the stainless steel is relatively thin. While such clad metal constructions deploy some layers of aluminum between the copper and stainless steel, the steel is still a limitation to heat transfer. Further, such laminates are complicated to fabricate and expensive, having many layers that must be metallurgically bonded in the cladding process. For this reason, depending on the sheet cladding process, the copper core is not always continuous, and can be very thin, with holes or perforations though which the aluminum layers are extruded through to bond to each other encapsulating the copper.

It is therefore a first object of the present invention to provide copper cookware with improved durability for long life and easy maintenance without sacrificing the thermal performance.

It is also an object of the invention to provide copper cookware that requires less or no cooking oil to prevent food from sticking, as well as making cleaning and maintenance easier for the consumer.

SUMMARY OF INVENTION

In the present invention, the first object is achieved by providing a cookware article comprising a bottom having an upward facing first surface and an opposite the downward facing second surface, substantially upright wall surrounding said bottom and terminating at an upper rim to provide a fluid containing vessel, wherein the bottom and walls consist essentially of an inner core of copper metal and an outer cladding layers of aluminum surrounding both sides of the copper core.

A second aspect of the invention is characterized by the outer cladding layers of this cookware vessel being anodized to provide a scratch resistance alumina coating.

Another aspect of the invention is characterized by such a scratch resistant alumina coating on the interior of the fluid containing vessel being further protected by a non-stick coating.

The above and other objects, effects, features, and advantages of the present invention will become more apparent from the following description of the embodiments thereof taken in conjunction with the accompanying drawings.

BRIEF DESCRIPTION OF THE DRAWINGS

FIG. 5A-F illustrate various optional configuration for the rim of the vessel of FIGS. 1, 2 and 3.

DETAILED DESCRIPTION

Referring to FIGS. 1 through 7, wherein like reference numerals refer to like components in the various views, there is illustrated therein a new and improved anodized clad copper cookware, generally denominated 100 herein.

Figure 2A:
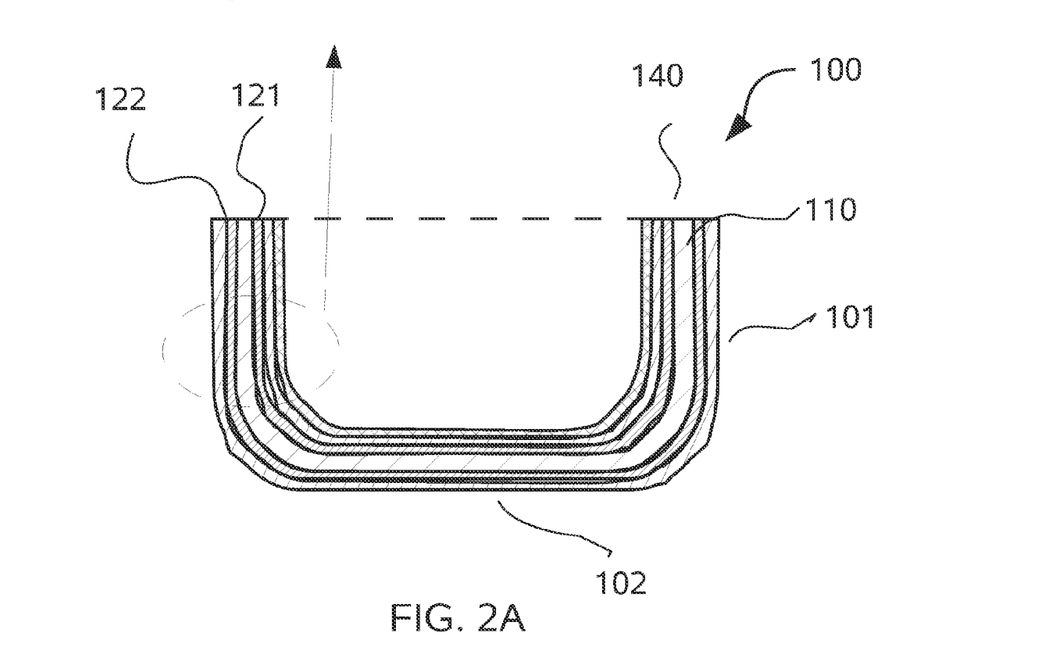
FIG. 2A is a cross-section elevational of a third embodiment of the cooking vessel.
Figure 2B:
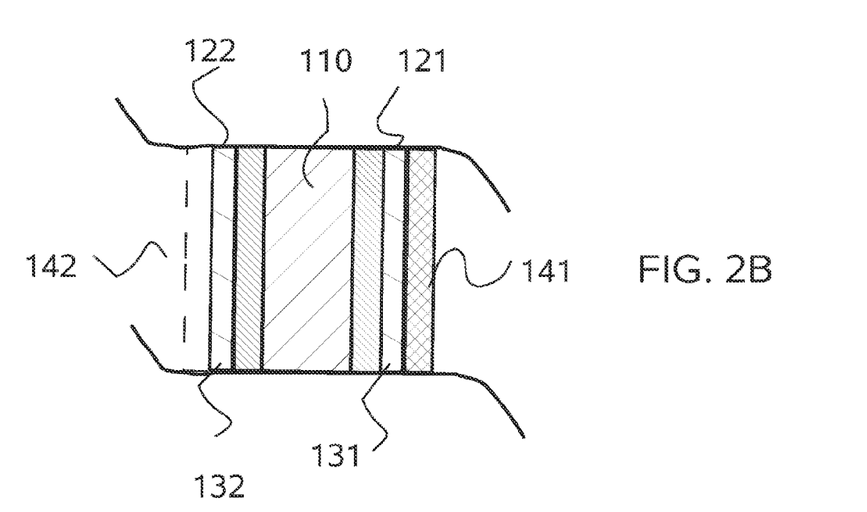
FIG. 2B is an expanded cross-sectional elevation of the portion of the second embodiment indicated by the broken line oval in FIG. 2A FIG. 3A-3H illustrate steps in the process of forming the vessels of FIGS. 1, 2 and 3 from an aluminum clad copper sheet.

In accordance with the present invention the cookware article 100 has a continuous core of copper, or an alloy thereof, 110 that are substantially surrounded by aluminum, or an alloy thereof, cladding layers 121 and 122 on both sides, in which preferably at least on one side, and more preferably on both exterior sides of the aluminum have an anodized finish in which at least the food contacting layer is alumina or aluminum oxide ($Al_2O_3$) 131 and 132 (as shown in FIGS. 2A and 2B). Such an outer coating can be further coated with relatively durable non-stick coatings such as organic and inorganic non-stick coating 141. Such coating typically comprise low surface energy organic polymers, as well as reinforcing filler and may be deposited as consecutive multiple layers of slightly different composition to improve adhesion and durability. The low surface energy polymers are typically fluoro-hydrocarbon polymers, and/or silicone containing polymers. Various US patents teach compositions of matter and methods of applying organic based and non-stick coatings to cookware vessels. These include U.S. Pat. No. 3,986,993 to Vassiliou (issued Oct. 19, 1976); U.S. Pat. No. 4,118,537 to Vary, et al. (issued Oct. 3, 1978); U.S. Pat. No. 4,321,177 to Wilkinson (issued Mar. 23, 1982); U.S. Pat. No. 5,691,067 to Patel (issued Oct. 25, 1997) and U.S. Pat. No. 6,133,359 to Bate, et al. (issued Oct. 17, 2000), all of which are incorporated herein by reference. The non-stick coating 141 protects the alumina layer 131 from degradation by acidic foods.

It should be further appreciated that, in contrast to copper cookware clad with stainless steel, it is difficult to add a non-stick coating, without adding further intermediate layers than degrade thermal conductivity further, and would not improve the durability of the non-stick coating like the hard anodized alumina layer of the instant invention.

Figure 1A:
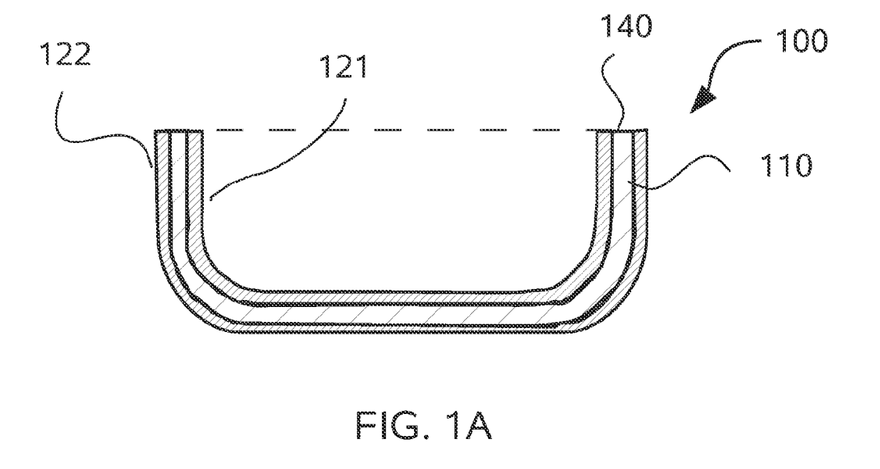
FIG. 1A is a cross-sectional elevation of a first embodiment of the cooking vessel.
Figure 1B:
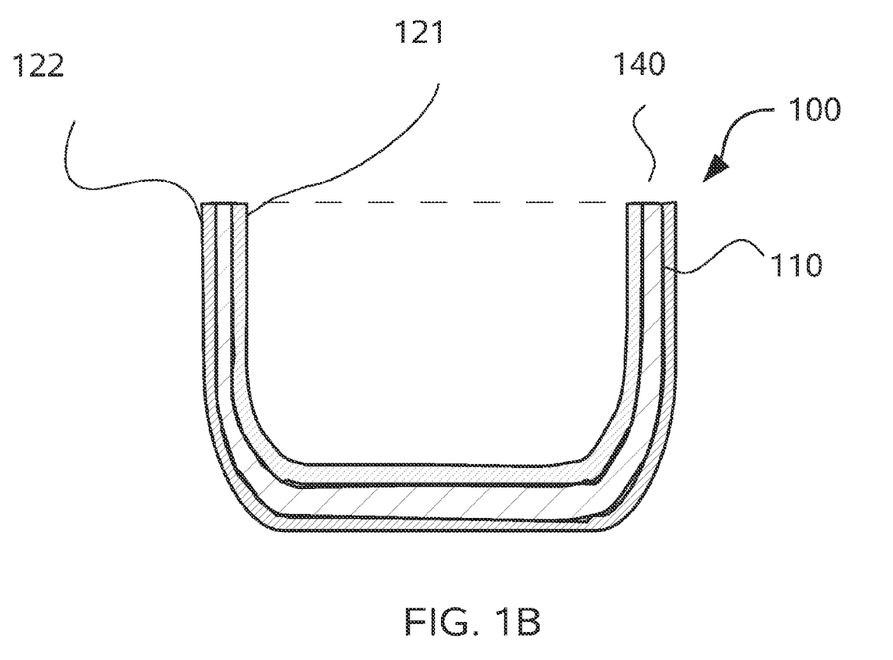
FIG. 1B is a cross-sectional elevation of a second embodiment of the cooking vessel.
Figures 3A, 3B:
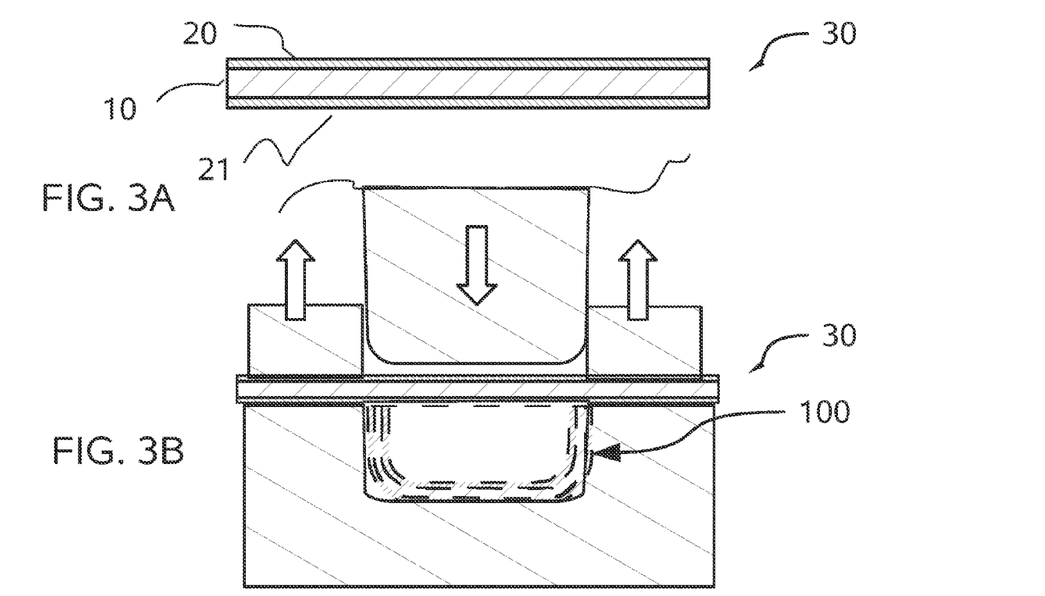
Figure 3C:
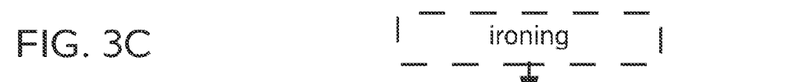
Figure 3D:
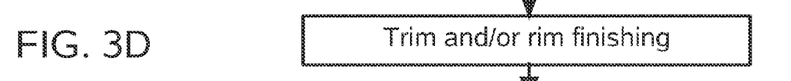
Figure 3E:
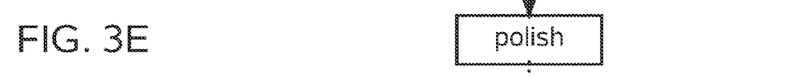
Figure 3F:
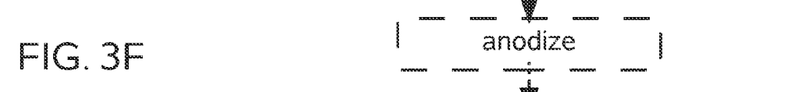
Figure 3G:
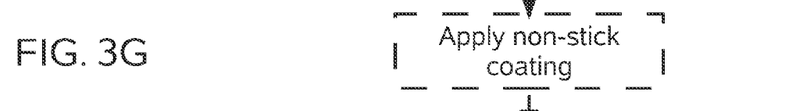
Figure 3H:
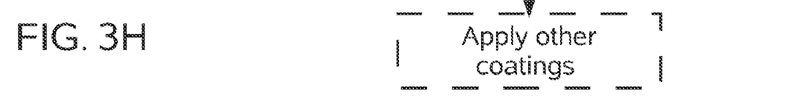

The cookware article of FIGS. 1 and 2 is formed as shown in FIG. 3A-3F. First, a substantially planar copper sheeting 10 that has been clad with aluminum metal, or an aluminum alloy, 20 and 21 on both sides to produce clad sheet 30, is placed in the mating die set used for deep drawing. Such cladding processes to produce sheet 30 generally require some degree of cold rolling; however the rolling can also be hot, deploy multiple passes and/or deploy additional layers to promote adhesion between the copper and aluminum layers. In FIG. 3B, the aluminum clad copper sheet 30 is deep drawn between mating dies to form the general shape of vessel 100.

It has been discovered that unlike conventional 5-ply cladding of steel/aluminum/copper/aluminum/steel, the construction of FIG. 3A is difficult to form into cookware by traditional deep drawing processes. It is believed that steel clad constructions of the softer copper and aluminum are easier to form because of the strength of the steel layer, which is usually as thick as the aluminum and copper layers in the clad construction.

Accordingly, another other aspect of the invention is improvements in the drawing process, in combination with the selection of materials and layer thicknesses to enable the consistent production of cookware of FIG. 1 and FIG. 2. Generally, it is preferred that the outer aluminum layers 20 and 21 together have a total thickness that is from about 80% to 200% of the copper thickness in sheet 30. More, preferably, the aluminum layers 20 and 21 should have an equal thickness. However, the optimum with in this range may vary considerably, depending on the workability of the aluminum alloy deployed after cold and/or hot rolling and annealing. Currently, it is believed that purer aluminum alloys are more preferred for their workability in forming the vessel 100.

Figures 5A, 5B, 5C, 5D, 5E, 5F:
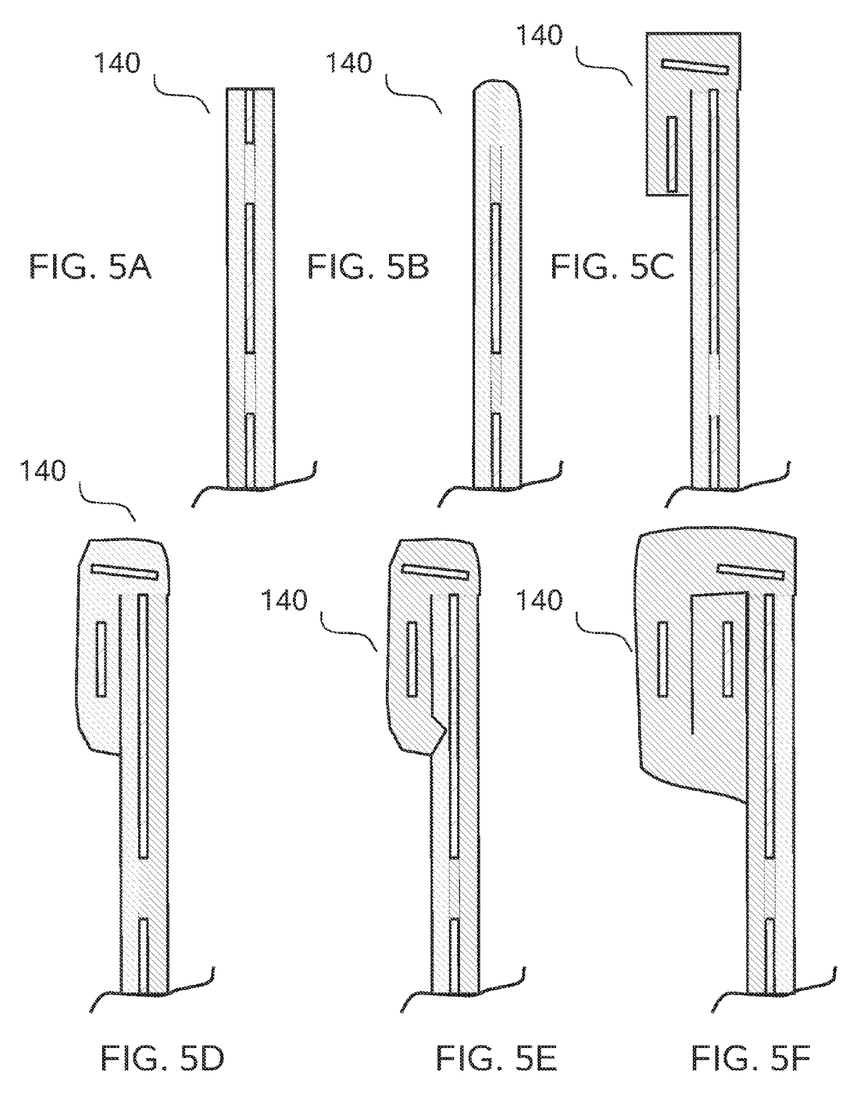

As it is important that the final cookware have a good surface appearance, it is desirable that the drawing process shown in FIG. 3B, or ironing if used to form the vessel in FIG. 1B, produce minimum surface roughness that cannot be economically finished with further polishing operations. Such polishing operation (FIG. 3D) is preferably performed after trimming in step (FIG. 3C) to form the rim of the vessel 140. The step shown in FIG. 3C may also include other rim finishing processes shown in FIG. 5B-F, as discussed below.

It is also important that the drawing process result in a consistent product that has a low defect level and that requires a consistent level of final surface finishing, such as polishing, to minimize the reject and rework required to provide efficient production capability.

It has been discovered that the above objectives are more readily achieved when the clad material shown in FIG. 3 has a consistent thickness and is either annealed during the drawing process, such as in hot working, or after, as well as just before forming in cookware by deep drawing or a combination of drawing and ironing processes. If the clad sheet 30 has not been annealed previously it is desirable that such annealing occur for about 15 to 30 minutes at temperatures that range from about 250° C., with correspondingly lower times for higher temperatures, as for about 5 minutes at about 430° C. However, it is also important that the annealing not be excessive, as this can lead to an "orange peel" like surface roughness appearance after forming the cookware, which is likely due to too large a grain size in the aluminum before forming. Thus, depending on the cladding process and the nature of the cookware forming process, the annealing process, if any, would be adjusted accordingly to obtain the right balance of mechanical properties in the copper core and outer aluminum layers.

The need for annealing the clad metal sheet 30 before forming is somewhat dependent on the drawing conditions and the shape of the pan, that is drawing at higher rates or to higher local strain ratios, generally requires some annealing to reform the grain structure in the aluminum alloy that is formed either in the rolling or cladding process. Generally, for clad material 30 in which the aluminum alloys is 3003 grade annealing for about 15 minutes at between about 260 to 300° C. is helpful, but for 1050 grade aluminum the annealing temperature is preferably at least about 280° C.

A currently preferred construction for the clad material 30 used to form the vessel 100 has a copper core 10 that is about 1 mm thick and surrounding aluminum layers 20 and 21 that are each at least about 0.4 mm thick. It may be preferable that these aluminum layers 20 and 21 are slightly thicker, that is at least about 0.5 mm thick, so that the total thickness of the aluminum from both sides of the clad metal is about the same or greater than the copper core thickness.

Further, the vessel formed by deep drawing can be ironed to increase the wall height, while thinning the copper and or aluminum layers therein, leaving a thicker copper layer in the bottom, as shown in the vessel 100 in FIG. 1B. Such ironing is optional and represented by the step shown in FIG. 3C. In ironing, a series of mating internal and external dies of increasing smaller gap are inserted around the vessel wall to draw in upward to reduce the thickness.

After the vessel 100 is trimmed and/or finished at rim 140 it preferably undergoes a surface polishing in the step as represented by FIG. 3E before the optional anodizing in the step shown in FIG. 3F. Additional polishing may be deployed after anodizing. Further, the optional non-stick coating 141 is applied in the step represented by FIG. 3G, after which an additional coating (FIG. 3H) may be applied to external surfaces 132, adding layer 142 shown in FIG. 2B. Coating 142 can be a ceramic, enamel or lacquer coatings for appearance or to provide additional durability or chemical resistance to the alumina layer 132. The order of steps shown by FIGS. 3G and 3H may be reversed. Coating 142 may extend around the entire exterior of the vessel 100 or just the surrounding walls 101, leaving exterior bottom 102 coated with aluminum oxide 132 formed by anodizing the aluminum layer 122. Ideally any coating on the exterior bottom 102 is relatively thin to avoid impairing the heat transfer from the flame or heating element to the copper core 110.

Figure 4:
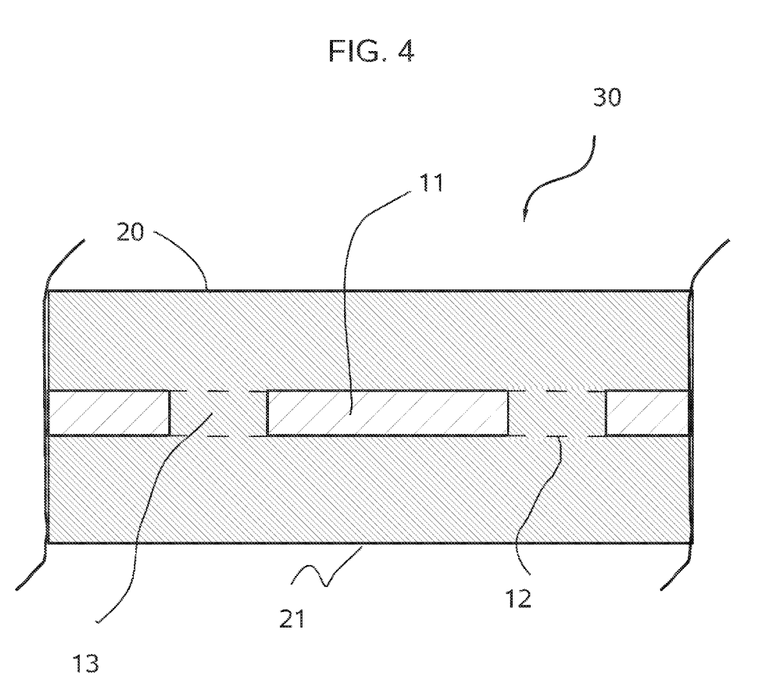
FIG. 4 is a cross sectional elevation of an alternative embodiment of the aluminum clad copper sheet that may be used to form the vessel of FIGS. 1, 2 and 3.

FIG. 4 illustrates another embodiment where the aluminum layers 20 and 21 are at least about as thick as the copper layer 11 which has a plurality of spaced apart perforations 12 to allow the opposing aluminum layers to metallurgically bond at region 13 with each other during the cladding process. As the perforations 12 in the copper may be exposed when the rim 140 is trimmed, as shown in FIG. 5A, it may be preferable to fold the rim 140 one or more times as shown in FIG. 5BC-F to conceal the perforated nature of the copper layer 11. This can be achieved by folding the rim 140 over on the outside wall 101 of the vessel 100 (FIG. 5C-5F) as well as reaming out a thin ring of copper at rim 140 and then sealing the surrounding aluminum layers 121 and 122 together to completely cover the copper core 11, as shown in FIG. 5B. Alternatively the copper core 10 or 11 can be hidden or protected by making a single fold with rounding of the aluminum as the end of the folded section (FIG. 5D) where the edge at the end of the fold is inserted into vessel wall (FIG. 5E). Alternatively, the double fold of the rim 140 shown in FIG. 5F, triples the rim thickness and completely hides any perforation that might be visible in the copper layer 11. Depending on the ductility of the finished vessel the same treatments could be used to increase the wall thickness at the rim 140 where the copper core 110 is continuous as shown in the embodiments of FIG. 1-3.

It has been discovered from both Finite Element Modeling and actual testing that the inventive pan provides unexpected advantages over the prior art stainless steel clad cookware having the layer structure: 300 series grade stainless steel (SS) (1.0 mm)/Al (3003 alloy) (0.4 mm)/Cu (1 mm)/Al (0.4 mm)/SS (1 mm) with a total thickness of 3.8 mm.

This was compared against the inventive construction: anodized aluminum (Alumina or aluminum oxide) 0.04 mm/Aluminum (3003 alloy) 0.4 mm/Cu (99.99%) 1.0 mm/Aluminum (3003 alloy) 0.4 mm/anodized aluminum (Alumina or aluminum oxide) 0.04 with a total thickness of about 1.808 mm.

In comparison to convention stainless steel clad cookware, it should be noted that even though the outer alumina layer would be expected to have a relatively low thermal conductivity than stainless steel, being both an oxide and a generally porous material, the actual performance compares rather favorably with a finite element model that is discussed below.

The FEM model simulated a hot flame with 2 heat sources, each ½ inch wide disposed 2" from the center line of the pan (i.e. sources are symmetric about the center of the pan, spaced 4 inches apart) with a heat source/flame temperature 2,200K and a heat flux of 80,000 W/m$^2$. It should be appreciated that in these theoretical models, the pans were dry for the simplicity of modeling accurately. It was also assume that Top surface of the pan had an emissivity 0.85 in radiating heat to the ambient atmosphere while the bottom surface facing the flame had a convection rate of 10 W/m$^2$ to an average ambient of 1400° K.

Figure 6:
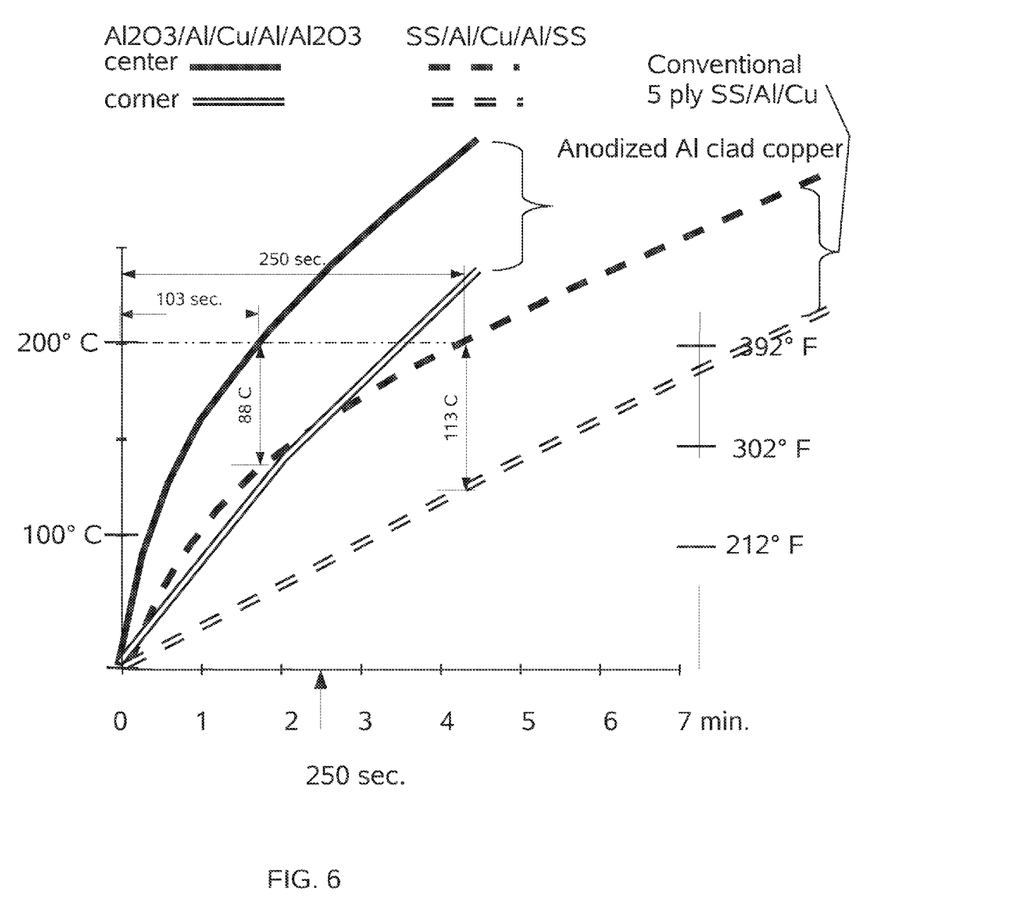
FIG. 6 is a graph comparing the theoretical thermal performance of the inventive pan with a stainless steel clad copper core pan.

FIG. 6 compares the derived temperature at the center and edge of the inventive pan having the $Al_2O_3$/Al/Cu/Al/$Al_2O_3$ construction against a pan having the construction Stainless steel/Al/Cu/Al/Stainless steel over a seven (7) minute period from the initiation of heating with heat source modeled as equivalent to a flame that impinges a narrow annular region about the geometric center of the pan.

It should be appreciate the inventive construction reached the cooking temperature of about 200° C. at the center in about 103 seconds, while it takes more than twice as much time (250 sec.) for the prior art pan.

Further, the difference in temperature between the center and edge of the inventive pan is only 88° C., when the 200 C is reached the center. In contrast, the prior art pan still has a temperature gradient of 113° C. when the center reaches 200° C.

Figure 7:
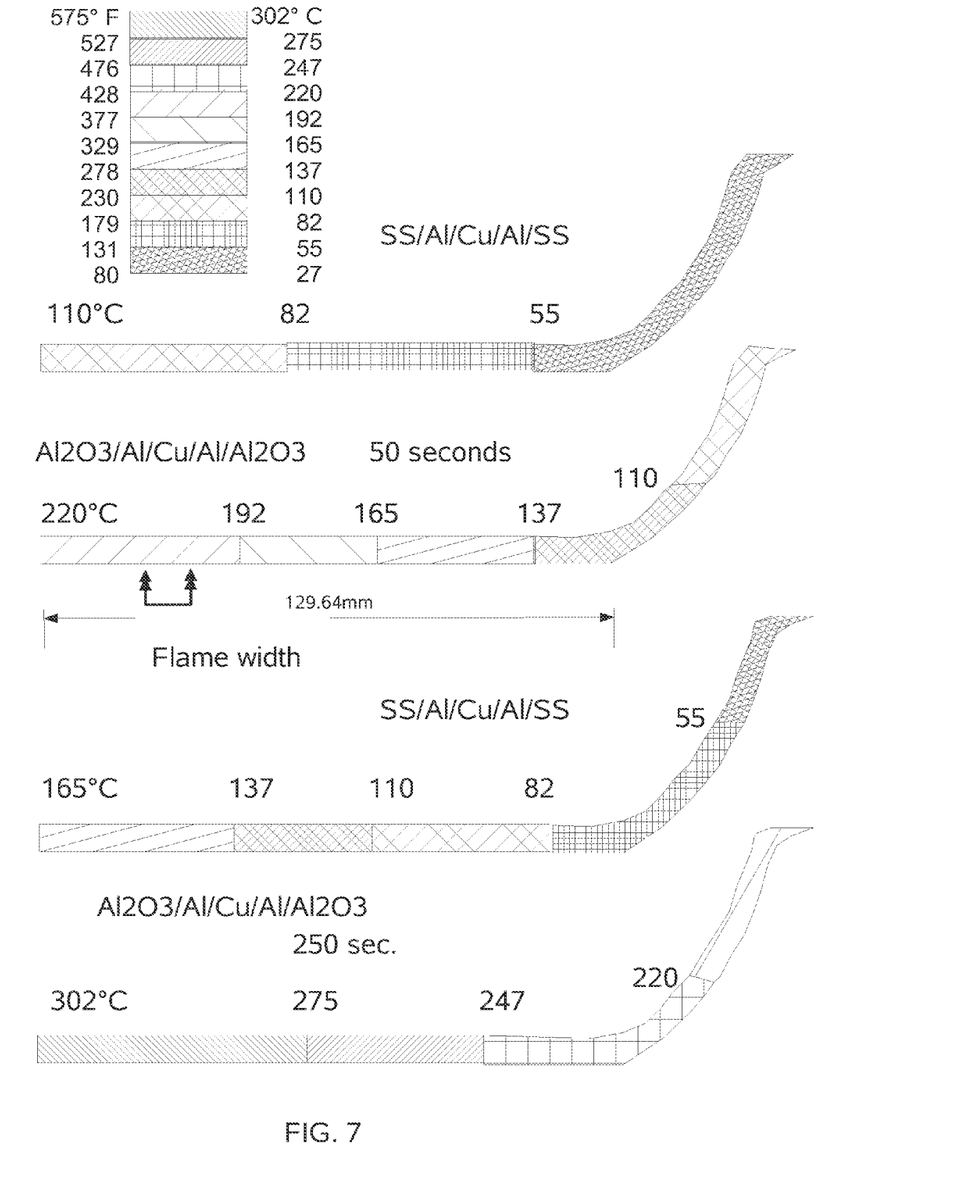
FIG. 7 are diagrams comparing the theoretical thermal gradients across the pans compared in FIG. 6 at two different time period.

FIG. 7 shows the same trend in which shading bands represent the average temperature though the thickness at 50 and 250 second While the invention has been described in connection with various preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. A cookware article comprising:
   a) a bottom having an upward facing first surface opposite a downward facing second surface,
   b) substantially upright walls surrounding said bottom and terminating at an upper rim to provide a fluid containing vessel,
   c) wherein the bottom and upright walls comprise:
      i) an inner core of copper metal outer;
      ii) a cladding of aluminum on both sides of the copper metal inner core,
      iii) a coating of aluminum oxide on both sides of the aluminum cladding not contacting the copper metal inner core wherein the downward facing surface of said bottom is the layer of aluminum oxide on the cladding of aluminum that surrounds the inner core of copper metal, wherein the combined thickness of the aluminum cladding on both sides of the copper core is at least 80% of the thickness of the copper core and further comprising a non-stick coating on the aluminum oxide coating on the upward facing first surface.

2. A cookware article comprising:
   a) a bottom having an upward facing first surface opposite a downward facing second surface,
   b) substantially upright walls surrounding said bottom and terminating at an upper rim to provide a fluid containing vessel,
   c) wherein the bottom and upright walls comprise:
      i) an inner core of copper metal outer;
      ii) a cladding of aluminum on both sides of the copper metal inner core,
      iii) a coating of aluminum oxide on both sides of the aluminum cladding not contacting the copper metal inner core wherein the downward facing surface of said bottom is the layer of aluminum oxide on the cladding of aluminum that surrounds the inner core of copper metal, and wherein the copper core has a thickness of at least about 1 mm and the aluminum cladding on each side of the copper core has a thickness of at least about 0.4 mm,
      iv) a non-stick coating on the aluminum oxide coating on the upward facing first surface.

3. A cookware article comprising:
   a) a bottom having an upward facing first surface opposite a downward facing second surface,
   b) substantially upright walls surrounding said bottom and terminating at an upper rim to provide a fluid containing vessel,
   c) wherein the bottom and upright walls comprise:
      i) an inner core of copper metal outer;
      ii) a cladding of aluminum on both sides of the copper metal inner core,
      iii) a coating of aluminum oxide on both sides of the aluminum cladding not contacting the copper metal inner core wherein the downward facing surface of said bottom is the layer of aluminum oxide on the cladding of aluminum that surrounds the inner core of copper metal, a non-stick coating on the aluminum oxide coating on the upward facing first surface, and wherein the combined thickness of the aluminum cladding on both sides of the copper core is at least 80% of the thickness of the copper core.

4. A cookware article according to claim 3 wherein the copper core has a thickness of at least about 1 mm and the aluminum cladding on each side of the copper core has a thickness of at least about 0.4 mm.

5. A cookware article comprising:
   a) a bottom having an upward facing first surface opposite a downward facing second surface,
   b) substantially upright walls surrounding said bottom and terminating at an upper rim to provide a fluid containing vessel, c) wherein the bottom and upright walls comprise:
   i) an inner core of copper metal outer;
   ii) a cladding of aluminum on both sides of the copper metal inner core,
   iii) a coating of aluminum oxide on both sides of the aluminum cladding not contacting the copper metal inner core wherein the downward facing surface of said bottom is the layer of aluminum oxide on the cladding of aluminum that surrounds the inner core of copper metal, wherein the copper core is exposed at the rim of the vessel, and the copper core has a thickness of at least about 1 mm and the aluminum cladding on each side of the copper core has a thickness of at least about 0.4 mm.

6. A cookware article comprising:
a) a bottom having an upward facing first surface opposite a downward facing second surface,
b) substantially upright walls surrounding said bottom and terminating at an upper rim to provide a fluid containing vessel,
c) wherein the bottom and upright walls comprise:
   i) an inner core of copper metal outer;
   ii) a cladding of aluminum on both sides of the copper metal inner core,
   iii) a coating of aluminum oxide on both sides of the aluminum cladding not contacting the copper metal inner core wherein the downward facing surface of said bottom is the layer of aluminum oxide on the cladding of aluminum that surrounds the inner core of copper metal, wherein the copper core is exposed at the rim of the vessel, and the combined thickness of the aluminum cladding on both sides of the copper core is at least 80% of the thickness of the copper core.

7. A cookware article according to claim 6 wherein the copper core has a thickness of at least about 1 mm and the aluminum cladding on each side of the copper core has a thickness of at least about 0.4 mm.

8. A cookware article comprising:
a) a bottom having an upward facing first surface opposite a downward facing second surface,
b) substantially upright walls surrounding said bottom and terminating at an upper rim to provide a fluid containing vessel,
c) wherein interior portions of the bottom and upright walls consist essentially of:
   (i) an inner core of copper metal,
   (ii) an outer cladding of at least one of aluminum and an alloy of aluminum attached on a first surface to both sides of the copper metal inner core,
   (iii) an aluminum oxide layer formed on each second surface of the at least one of aluminum and an alloy of aluminum cladding layer that is opposite the first surface and the inner core of copper metal, and
d) wherein the downward facing second surface of the bottom is the aluminum oxide layer on the second surface.

9. A cookware article according to claim 8 wherein the upward facing first surface of the bottom is a non-stick coating deposit directly on the aluminum oxide layer that is opposite the aluminum oxide layer on the downward facing second surface of the bottom.

10. A cookware article according to claim 9 wherein the non-stick coating comprises a low surface energy organic polymer.

11. A cookware article according to claim 8 wherein the copper core has a thickness of at least about 1 mm and the aluminum cladding on each side of the copper core has a thickness of at least about 0.4 mm.

12. A cookware article according to claim 8 wherein the combined thickness of the aluminum cladding on both sides of the copper core is at least 80% of the thickness of the copper core.

13. A cookware article according to claim 8 wherein the copper core has a thickness of at least about 1 mm and the aluminum cladding on each side of the copper core has a thickness of at least about 0.4 mm.

14. A cookware article comprising:
a) a bottom having an upward facing first surface opposite a downward facing second surface,
b) substantially upright walls surrounding said bottom and terminating at an upper rim to provide a fluid containing vessel, the upright walls having an inward facing first surface and an outward facing second surface,
c) wherein the inward and upward facing first surface comprise a layer of anodized aluminum, and
d) wherein a portion of the bottom and upright walls consist essentially of
   i) an inner core of copper metal,
   ii) inner and outer cladding layers of at least one of aluminum and an alloy thereof, each in contact with an opposite side of the copper metal core, and
   iii) a layer of anodized aluminum on the outer cladding of aluminum that forms the downward and outward facing second surface,
e) and wherein the inward and upward facing first surface is formed on the outer cladding layer of at least one of aluminum and an alloy thereof.

15. The cookware article of claim 14 and further comprising a non-stick coating deposited on the inward and outward facing first surface.

16. The cookware article of claim 15 wherein the wherein the non-stick coating comprises a low surface energy organic polymer.

17. The cookware article of claim 14 wherein the copper core is exposed at the rim of the vessel.

18. A cookware article according to claim 14 wherein the copper core is covered by the aluminum cladding at the rim of the vessel.

19. A cookware article according to claim 14 wherein the copper core has a thickness of at least about 1 mm and the aluminum cladding on each side of the copper core has a thickness of at least about 0.4 mm.

20. A cookware article according to claim 14 wherein the combined thickness of the aluminum cladding on both sides of the copper core is at least 80% of the thickness of the copper core.

21. A cookware article according to claim 20 wherein the copper core has a thickness of at least about 1 mm and the aluminum cladding on each side of the copper core has a thickness of at least about 0.4 mm.

* * * * *